United States Patent
Kim et al.

(10) Patent No.: US 11,230,156 B2
(45) Date of Patent: Jan. 25, 2022

(54) COOLING AND HEATING SYSTEM FOR HYDROGEN FUEL VEHICLES

(71) Applicant: HYLIUM INDUSTRIES, INC., Gyeonggi-do (KR)

(72) Inventors: Seo Young Kim, Gyeonggi-do (KR); Hong Yeol Yun, Gyeonggi-do (KR)

(73) Assignee: HYLIUM INDUSTRIES, INC.

( * ) Notice: Subject to any disclaimer, the term of this patent is extended or adjusted under 35 U.S.C. 154(b) by 142 days.

(21) Appl. No.: 16/821,300

(22) Filed: Mar. 17, 2020

(65) Prior Publication Data
US 2020/0298651 A1    Sep. 24, 2020

(30) Foreign Application Priority Data
Mar. 19, 2019 (KR) .................. 10-2019-0030902

(51) Int. Cl.
| | | |
|---|---|---|
| B60H 1/00 | (2006.01) | |
| B60L 1/00 | (2006.01) | |
| B60L 50/70 | (2019.01) | |

(52) U.S. Cl.
CPC ............ *B60H 1/00278* (2013.01); *B60L 1/00* (2013.01); *B60L 50/70* (2019.02)

(58) Field of Classification Search
None
See application file for complete search history.

(56) References Cited

U.S. PATENT DOCUMENTS

| | | | | |
|---|---|---|---|---|
| 3,669,751 A | * | 6/1972 | Richman | H01M 8/06 429/414 |
| 2002/0027027 A1 | * | 3/2002 | Skala | B60L 58/33 180/65.22 |
| 2019/0111758 A1 | * | 4/2019 | Shaikh | B60H 1/00392 |

* cited by examiner

*Primary Examiner* — Jared Fureman
*Assistant Examiner* — Joel Barnett
(74) *Attorney, Agent, or Firm* — Mendelsohn Dunleavy, P.C.

(57) ABSTRACT

Disclosed is a cooling and heating system utilized in a vehicle using a fuel cell configured to generate electricity with hydrogen and oxygen supplied thereto as a power supply source, wherein a power supply source apparatus of a conventional hydrogen fuel vehicle is utilized as the cooling and heating system and wherein a heat exchanger necessary in the process of heat-exchanging liquefied hydrogen is utilized as a heating means and cool air generated in the process of cooling high-temperature coolant discharged after cooling the fuel cell through a heat exchanger is utilized as a cooling means.

7 Claims, 3 Drawing Sheets

COOLING AND HEATING SYSTEM FOR HYDROGEN FUEL VEHICLES

CROSS-REFERENCE TO RELATED APPLICATION

This application claims priority from Korean Patent Application No. 10-2019-0030902, filed on Mar. 19, 2019, in the Korean Intellectual Property Office, the disclosure of which is incorporated herein by reference in its entirety.

BACKGROUND OF THE INVENTION

1. Field of the Invention

The present invention relates to a cooling and heating system utilized in a vehicle using a fuel cell. configured to generate electricity with hydrogen and oxygen supplied thereto as a power supply source.

2. Description of the Related Art

Since conventional power sources using fossil fuels, secondary batteries, etc. have various shortcomings in terms of environmental pollution, noise, charge time, durability, and the like, a power source using liquefied hydrogen has been increasingly used in recent years.

Liquefied hydrogen, which is fuel that is 10 times or more lighter than fossil fuels, has attracted considerable attention as fuel for propellants, such as a rocket and an unmanned aerial vehicle (UAV), in the aerospace industry field. In recent years, a vehicle using hydrogen fuel as a power supply source has been commercialized in earnest, and demand for hydrogen fuel has abruptly increased with active research on commercialization of a vehicle, such as a drone taxi.

A power supply source apparatus using hydrogen includes a liquefied hydrogen tank configured to supply hydrogen and a fuel cell (an electricity generator) configured to generate electricity with hydrogen gas fed from the liquefied hydrogen tank and oxygen received from a compressor, and the electricity generated by the fuel cell is supplied to a motor so as to be used as a power source of a vehicle, etc. In addition, a refrigerant circuit configured to cool the fuel cell is formed, whereby the fuel cell is cooled.

That is, low-temperature liquefied hydrogen is supplied to the fuel cell through a heat exchanger, and a refrigerant is circulated in order to cool the heated fuel cell.

Meanwhile, such a vehicle is necessarily provided with a heating or cooling system, and a large amount of energy is used in order to realize the heating or cooling system.

In particular, the temperature of liquefied hydrogen is very low (−259.2° C.), and a refrigerant discharged after cooling the fuel cell has a high temperature. In the case in which the liquefied hydrogen and the refrigerant are utilized in the heating or cooling system, therefore, it is possible to greatly reduce energy consumption. Consequently, there is a need for research thereon.

SUMMARY OF THE INVENTION

It is an object of the present invention to provide a cooling and heating system for hydrogen fuel vehicles capable of utilizing a power supply source apparatus configured to generate electricity with hydrogen and oxygen supplied thereto as a cooling and heating system.

In accordance with the present invention, the above and other objects can be accomplished by the provision of a cooling and heating system of a hydrogen fuel vehicle using a fuel cell configured to generate electricity with hydrogen and oxygen supplied thereto as a power supply source, the cooling and heating system including a first heat exchanger configured to perform heat exchange with liquefied hydrogen supplied from a liquefied hydrogen tank, a second heat exchanger configured to perform heat exchange with the fluid heat-exchanged with the first heat exchanger in order to form gaseous hydrogen and to perform heat exchange with a coolant discharged after cooling the fuel cell and then supplied along a first path, the fuel cell configured to generate electricity with the gaseous hydrogen, formed as the result of heat exchange performed by the second heat exchanger, and oxygen supplied thereto, a third heat exchanger configured to perform heat exchange with a coolant discharged after cooling the fuel cell and then supplied along a second path, a first radiator having the first heat exchanger disposed therein, the first radiator being configured to supply cool air in the fluid passing through the first heat exchanger into the vehicle, and a second radiator having the third heat exchanger disposed therein, the second radiator being configured to supply hot air in the fluid passing through the third heat exchanger into the vehicle, wherein the second heat exchanger is constantly operated, and the first radiator and the second radiator are selectively operated under control of a controller.

The first radiator and the second radiator may be configured such that blowers are installed adjacent to the first heat exchanger and the second heat exchanger in order to supply the cool air and the hot air into the vehicle, respectively.

The first radiator and the second radiator may be configured such that filters are formed in paths along which the cool air and the hot air pass, respectively.

In the case in which the first radiator is not operated, the first heat exchanger may be provided as a path along which the liquefied hydrogen passes, whereby the liquefied hydrogen may be supplied to the second heat exchanger.

The coolant heat-exchanged with the second heat exchanger may be supplied to the fuel cell through a pump in order to cool the fuel cell.

A check valve may be formed in the first path in order to supply the coolant discharged from the fuel cell toward the second heat exchanger.

A solenoid valve may be formed in the second path, the solenoid valve may be closed to supply the coolant to the second heat exchanger along the first path under control of the controller when a summer season mode is executed, and the solenoid valve may be opened to supply the coolant to the second heat exchanger and the third heat exchanger along the second path under control of the controller when a winter season mode is executed.

The cool air in the fluid that has passed through the first heat exchanger or the hot air in the fluid that has passed through the third heat exchanger may be supplied to an air conditioning room in the vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention relates to a cooling and heating system utilized in a vehicle using a fuel cell configured to generate electricity with hydrogen and oxygen supplied thereto as a power supply source, and more particularly to a cooling and heating system for hydrogen fuel vehicles capable of utilizing a conventional power supply source apparatus as a cooling and heating system.

That is, cold energy of liquefied hydrogen is circulated for the purpose of cooling, and hot energy of a coolant discharged from the fuel cell is circulated for the purpose of heating, whereby it is possible to efficiently utilize energy.

Figure 1:
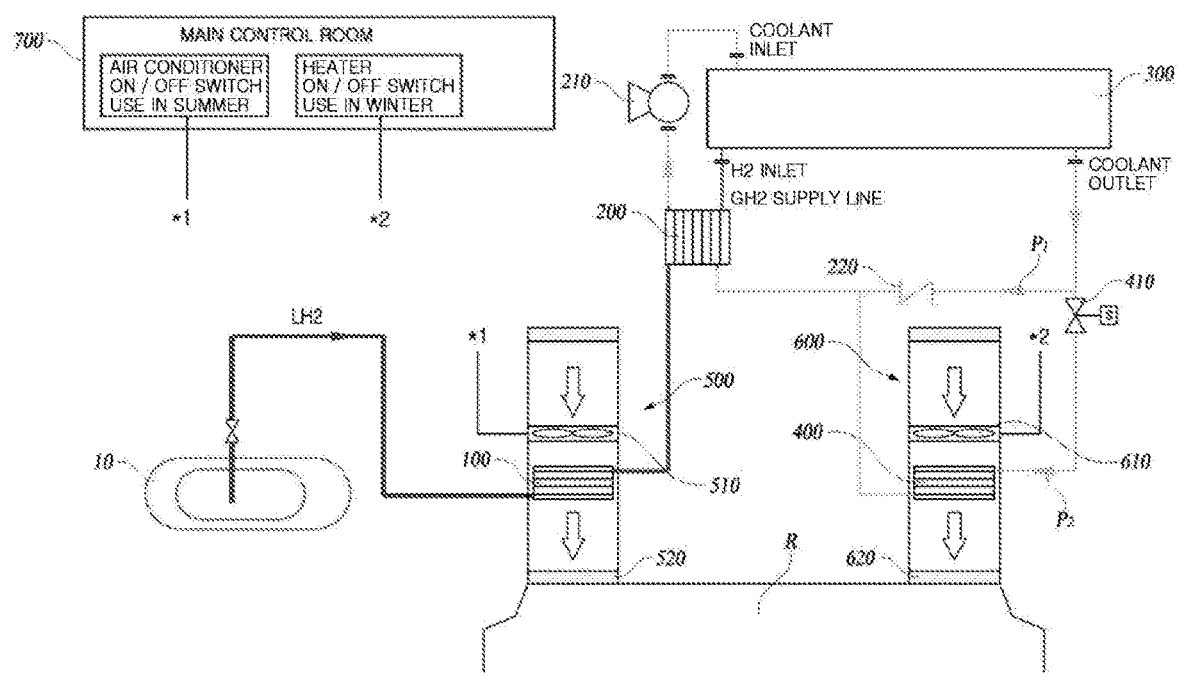
FIG. 1 is a schematic view showing main components of a cooling and heating system for hydrogen fuel vehicles according to the present invention.
Figure 2:
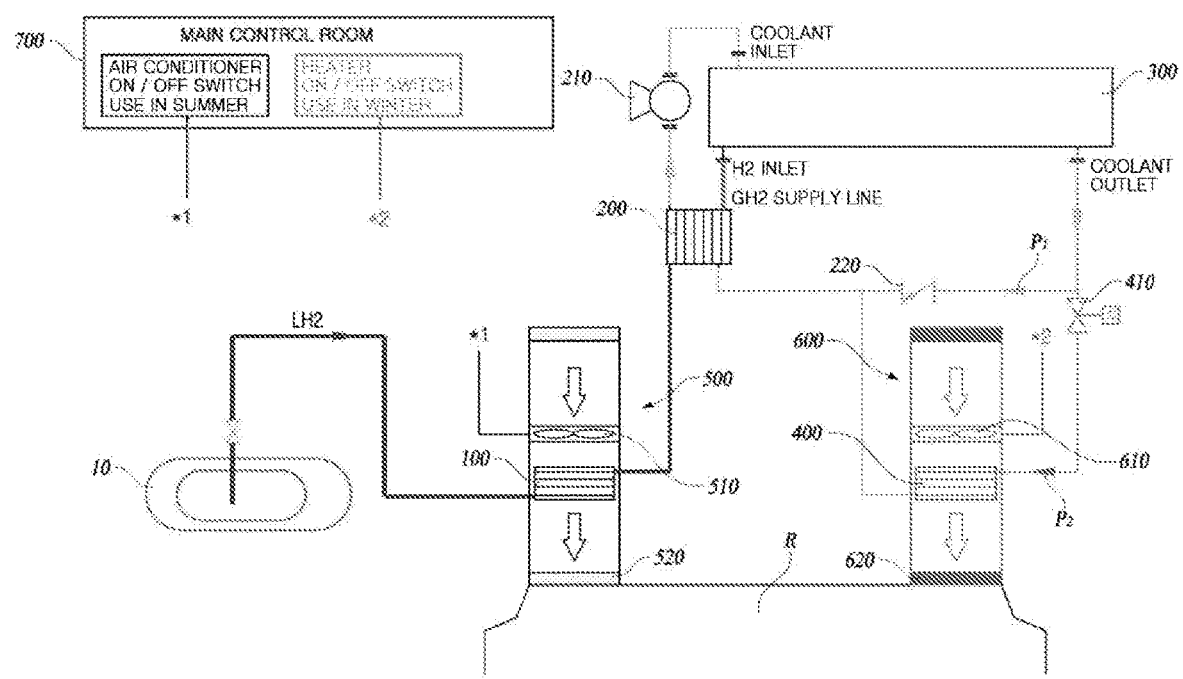
FIG. 2 is a schematic view showing a cooling and heating system for hydrogen fuel vehicles according to an embodiment of the present invention (a summer season mode)
Figure 3:
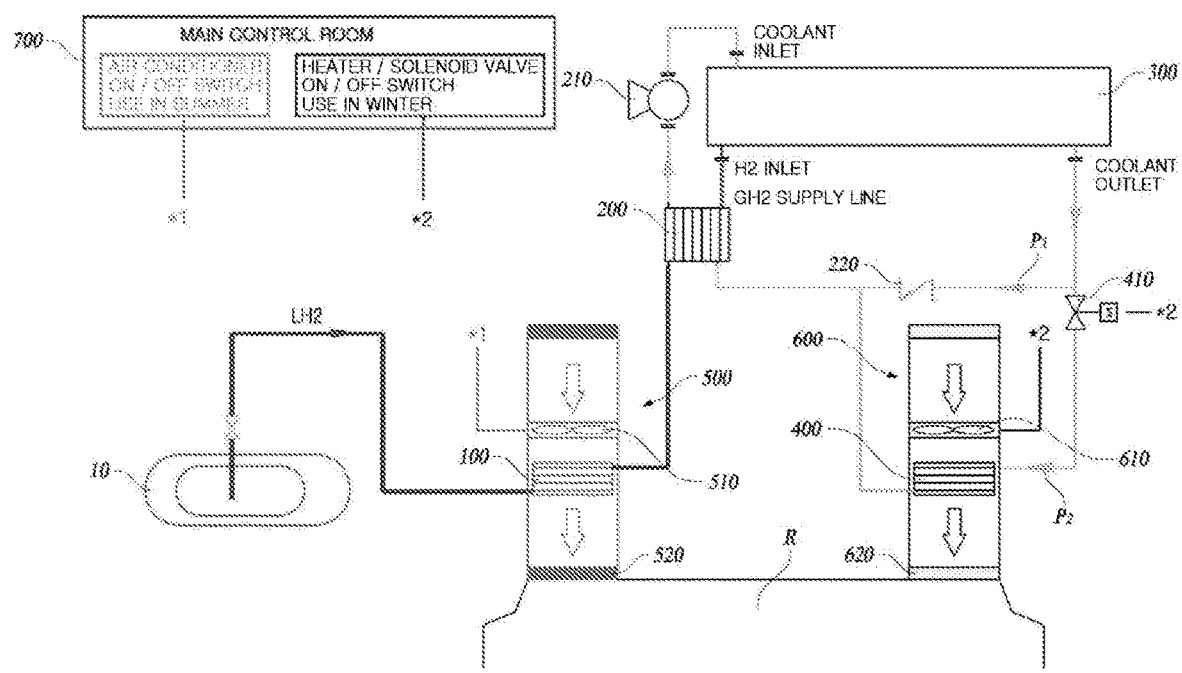
FIG. 3 is a schematic view showing the cooling and heating system for hydrogen fuel vehicles according to the embodiment of the present invention (a winter season mode).

Hereinafter, the present invention will be described in detail with reference to the accompanying drawings. FIG. 1 is a schematic view showing main components of a cooling and heating system for hydrogen fuel vehicles according to the present invention, FIG. 2 is a schematic view showing a cooling and heating system for hydrogen fuel vehicles according to an embodiment of the present invention (a summer season mode), and FIG. 3 is a schematic view showing the cooling and heating system for hydrogen fuel vehicles according to the embodiment of the present invention (a winter season mode).

The cooling and heating system for hydrogen fuel vehicles according to the present invention relates to a cooling and heating system that is used in a vehicle, such as a car configured to receive hydrogen as fuel and to use the received hydrogen as a power supply source and a drone taxi, and is characterized in that a conventional fuel cell apparatus system using hydrogen fuel is partially utilized, whereby the structure of the cooling and heating system is simple, and residual energy is utilized, whereby waste energy is efficiently used.

As shown in FIG. 1, the cooling and heating system for hydrogen fuel vehicles according to the present invention is a cooling and heating system of a vehicle using a fuel cell configured to generate electricity with hydrogen and oxygen supplied thereto as a power supply source, the cooling and heating system including a first heat exchanger 100 configured to perform heat exchange with liquefied hydrogen supplied from a liquefied hydrogen tank 10, a second heat exchanger 200 configured to perform heat exchange with the fluid heat-exchanged with the first heat exchanger 100 in order to form gaseous hydrogen and to perform heat exchange with a coolant discharged after cooling the fuel cell. 300 and then supplied along a first path P1, the fuel cell 300 configured to generate electricity with the gaseous hydrogen, formed as the result of heat exchange performed by the second heat exchanger 200, and oxygen supplied thereto, a refrigerant circuit unit configured tot supply the coolant heat-exchanged with the second heat exchanger 200 to the fuel cell 300 in order to cool the fuel cell 300, a third heat exchanger 400 configured to perform heat exchange with a coolant discharged after cooling the fuel cell. 300 and then supplied along a second path P2, a first radiator 500 configured to supply cool air in the fluid passing through the first heat exchanger 100 into the vehicle, and a second radiator 600 configured to supply hot air in the fluid passing through the third heat exchanger 400 into the vehicle, wherein the second heat exchanger 200 is constantly operated, and the first radiator 500 and the second radiator 600 are selectively operated under control of a controller 700.

The cooling and heating system for hydrogen fuel vehicles according to the present invention utilizes a power supply source apparatus used in a conventional hydrogen fuel vehicle. In general, the power supply source apparatus includes a liquefied hydrogen tank 10 configured to supply hydrogen and a fuel cell 300 configured to generate electricity with hydrogen gas supplied from the liquefied hydrogen tank 10 and oxygen supplied from a compressor. The electricity generated by the fuel cell 300 is supplied to a motor so as to be used as a power source of the vehicle. In addition, a refrigerant circuit configured to cool the fuel cell 300 is formed, whereby the fuel cell 300 is cooled.

As described above, the cooling and heating system for hydrogen fuel vehicles according to the present invention mainly includes a first heat exchanger 100 configured to perform heat exchange with liquefied hydrogen, a second heat exchanger 200 configured to perform heat exchange in order to form gaseous hydrogen and to perform heat exchange with a coolant discharged from a fuel cell. 300, the fuel cell 300, a refrigerant circuit unit, a third heat exchanger 400 configured to perform heat exchange with a portion of the coolant, a first radiator 500 configured to supply cool air into a vehicle, and a second radiator 600 configured to supply hot air into the vehicle, wherein the first radiator 500 and the second radiator 600 are selectively operated under control of a controller 700.

First, in the cooling and heating system for hydrogen fuel vehicles according to the present invention, the first heat exchanger performs heat exchange with liquefied hydrogen supplied from the liquefied hydrogen tank 10.

The liquefied hydrogen stored in the liquefied hydrogen tank 10 has a temperature of about −259.2° C., and the liquified hydrogen tank 10 is a hydrogen supply source that supplies hydrogen to the fuel cell (fuel cell stack) 300. The hydrogen is supplied to the fuel cell 300 along a feeding pipe in a gaseous state. Since hydrogen is stored in the liquefied hydrogen tank 10 in a liquid state, the volume of the liquefied hydrogen tank 10 may be reduced, whereby it is possible to efficiently utilize a space defined in the vehicle.

In general, the liquefied hydrogen stored in the liquefied hydrogen tank 10 is evaporated by heat supplied from the outside, and is supplied to the fuel cell 300 in a gaseous hydrogen state. In the present invention, the liquefied hydrogen is heat-exchanged with the first heat exchanger 100.

At this time, it is not necessary for all of the liquefied hydrogen to be heat-exchanged with the first heat exchanger 100 in order to form gaseous hydrogen, and it is sufficient to perform heat exchange only to the extent to which the liquefied hydrogen is usable as a cooling means according to the present invention. That is, the liquefied hydrogen that has passed through the first heat exchanger 100 may be a mixture of liquid hydrogen and gaseous hydrogen.

The first heat exchanger 100 is disposed in the first radiator 500, and cool air generated in the first heat exchanger 100 during heat exchange with the liquefied hydrogen is supplied into the vehicle so as to be usable at the time of cooling.

As described above, the first heat exchanger 100 performs heat exchange with a portion of the liquefied hydrogen (to the extent to which cooling is performed), and cool air generated at this time is utilized as a cooling means. That is, cold energy generated during conversion of the liquefied hydrogen into gaseous hydrogen through heat exchange is utilized, and the cold energy may be used as a cooling means without a separate cooling apparatus or energy source.

The second heat exchanger performs heat exchange with the fluid heat-exchanged with the first heat exchanger 100 in order to form gaseous hydrogen, and performs heat exchange with a coolant discharged after cooling the fuel cell 300 and then supplied along the first path P1. That is, the second heat exchanger 200 performs heat exchange with the liquefied hydrogen such that the liquefied hydrogen is completely converted into gaseous hydrogen. The gaseous hydrogen is supplied to the fuel cell 300. In addition, the second heat exchanger 200 performs heat exchange with a coolant discharged after cooling the fuel cell 300.

The gaseous hydrogen formed as the result of heat exchange performed by the second heat exchanger 200 is supplied to the fuel cell 300 by a pump 210, and electrical energy and water are generated through hydrogen oxidation reaction at a fuel electrode of the fuel cell 300 and oxygen reduction reaction at an air electrode of the fuel cell 300.

Here, the first path P1 along which the coolant is supplied to the second heat exchanger 200 is a path along which a coolant discharged from the fuel cell 300 is fed, and means a circulation path of a coolant for cooling the fuel cell 300. The second path P2 along which the coolant is fed, a description of which will follow, is a path along which the coolant is supplied to the third heat exchanger 400. The second path P2 is provided in order to use cool air generated during heat exchange.

A check valve 220 is formed in the first path P1 in order to supply the coolant discharged from the fuel cell 300 toward the second heat exchanger 200. That is, the process in which the coolant is circulated and heat-exchanged is repeatedly performed on the basis of the fuel cell 300 in order to cool the fuel cell 300.

As described above, the gaseous hydrogen formed as the result of heat exchange performed by the second heat exchanger 200 is supplied to the fuel cell 300, and the coolant cooled as the result of heat exchange performed by the second heat exchanger 200 is collected and then supplied to the refrigerant circuit by the pump 210 in order to cool the fuel cell 300.

The third heat exchanger 400 performs heat exchange with a coolant discharged after cooling the fuel cell 300 and then supplied along the second path P2. That is, a portion of the coolant discharged after cooling the fuel cell 300 is supplied to the second heat exchanger 200 along the first path P1 and cools the fuel cell 300 while being circulated in the refrigerant circuit, and a portion of the coolant discharged after cooling the fuel cell 300 is supplied to the third heat exchanger 400 along the second path P2 so as to be heat-exchanged with the third heat exchanger 400.

The third heat exchanger 400 is disposed in the second radiator 600, and hot air generated in the third heat exchanger 400 during heat exchange with the coolant is supplied into the vehicle so as to be usable at the time of heating.

A solenoid valve 410 is formed in the second path P2 in order to open and close the second path P2. That is, in the case in which the second path P2 is open, a portion of the coolant discharged after cooling the fuel cell 300 is fed to the third heat exchanger 400 along the second path P2, and in the case in which the second path P2 is closed, all of the coolant discharged after cooling the fuel cell 300 is fed to the second heat exchanger 200 along the first path P1.

Consequently, in the case in which the cooling and heating system according to the present invention is operated in a summer season mode, the solenoid valve 410 is closed, and therefore the coolant is supplied to the second heat exchanger 200 along the first path P1. In the case in which the cooling and heating system according to the present invention is operated in a winter season mode, the solenoid valve 410 is open, and therefore the coolant is supplied to the second heat exchanger 200 and the third heat exchanger 400 along the second path P2.

The coolant heat-exchanged with the third heat exchanger 400 is fed along the first path P1, and is circulated in the refrigerant circuit for cooling the fuel cell 300. That is, the coolant is supplied to the second heat exchanger 200, by which the temperature of the coolant is further lowered, and is then supplied to the fuel cell 300.

As described above, the third heat exchanger 400 performs heat exchange with a portion of the coolant (to the extent to which heating is performed), and hot air generated at this time is utilized as a heating means. That is, hot energy generated during cooling and circulation of the coolant is utilized, and the hot energy may be used as a heating means without a separate heating apparatus or energy source.

The above operation is performed under control of the controller 700. That is, the operation is performed through a cooling and heating on/off button disposed on a control board in the vehicle under control of the controller 700.

As described above, the first heat exchanger 100 is disposed in the first radiator 500, and cool air generated in the first heat exchanger 100 during heat exchange with the liquefied hydrogen is supplied into the vehicle so as to be usable at the time of cooling. In addition, the third heat exchanger 400 is disposed in the second radiator 600, and hot air generated in the third heat exchanger 400 during heat exchange with the coolant is supplied into the vehicle so as to be usable at the time of heating.

That is, the first radiator 500 is formed between the liquefied hydrogen tank 10 and the second heat exchanger 200, the first heat exchanger 100 is disposed in the first radiator 500, and cool air generated in the first heat exchanger 100 during heat exchange with the liquefied hydrogen is supplied into the vehicle, e.g. an air conditioning room R in the vehicle, such that the cooling and heating system according to the present invention is utilizable as a cooling system in summer, in which weather is hot (a summer season mode).

In addition, the second radiator 600 is formed between the solenoid valve 410 and the second heat exchanger 200, the third heat exchanger 400 is disposed in the second radiator 600, and hot air generated in the third heat exchanger 400 during heat exchange with the coolant is supplied into the vehicle, e.g. the air conditioning room R in the vehicle, such that the cooling and heating system according to the present invention is utilizable as a heating system in winter, in which weather is cold (a winter season mode).

Here, the first radiator 500 and the second radiator 600 are selectively operated under control of the controller 700, and may be operated through the cooling and heating on/off button disposed on the control board in the vehicle.

The second heat exchanger 200 is constantly operated such that, in the case in which the first radiator 500 is not operated, the first heat exchanger 100 is provided as a path along which the liquefied hydrogen passes, the liquefied hydrogen is directly fed to the second heat exchanger 200 so as to exchange heat with the second heat exchanger 200, and gaseous hydrogen formed as the result of heat exchange is supplied to the fuel cell 300. That is, the gaseous hydrogen, serving as fuel, is constantly supplied to the fuel cell 300 by the second heat exchanger 200.

The first radiator 500 and the second radiator 600 are connected to the interior of the vehicle or the air conditioning room R in the vehicle in order to selectively supply cool air or hot air into the vehicle. Air filters 520 and 620 are formed in the paths along which the cool air and the hot air pass, respectively, such that clean air can be supplied into the vehicle.

Although the first radiator 500 and the second radiator 600 may be configured to naturally emit cool air and hot air so as to be supplied into the vehicle, blowers 510 and 610 may be installed adjacent to the first heat exchanger 100 and the third heat exchanger 400, respectively, such that cool air and hot air can be efficiently supplied into the vehicle, thereby achieving efficient cooling and heating.

Hereinafter, the operation and effects of the present invention will be described.

FIG. 2 shows the case in which a summer season mode is selected under control of the controller 700, i.e. the first radiator 500 is operated, in the cooling and heating system according to the present invention.

In FIG. 2, the blue line indicates a path along which liquefied hydrogen passes through the first heat exchanger 100, which performs heat exchange with the liquefied hydrogen, and is fed after heat exchange, the red line indicates a path along which gaseous hydrogen formed as the result of heat exchange is supplied to the fuel cell 300, and the green line indicates a circulation path of a coolant for cooling the fuel cell 300. Here, only the first radiator 500 is activated and thus operated, and the second radiator 600 is inactivated and thus not operated.

When the first radiator 500 is operated under control of the controller 700, liquefied hydrogen from the liquefied hydrogen tank 10 passes through the first heat exchanger 100, and the first heat exchanger 100 performs heat exchange with the liquefied hydrogen. Cool air generated in the first heat exchanger 100 at this time is supplied to the air conditioning room R through the blower 510 in the first radiator 500 in order to increase temperature in the vehicle.

The liquefied hydrogen heat-exchanged with the first heat exchanger 100 is supplied to the second heat exchanger 200, which performs heat exchange with the liquefied hydrogen such that the liquefied hydrogen is completely converted into gaseous hydrogen, and the gaseous hydrogen is supplied to the fuel cell 300 through the pump 210 so as to be used as fuel.

The coolant for cooling the fuel cell 300 is circulated while flowing along the first path P1 in order to cool the fuel cell 300. After being cooled by the second heat exchanger 200, the coolant is supplied again to the fuel cell 300.

Since fuel must be supplied to the vehicle through the second heat exchanger 200 irrespective of operation of the first radiator 500, the second heat exchanger 200 is constantly operated when the vehicle is powered on or started.

FIG. 3 shows the case in which a winter season mode is selected under control of the controller 700, i.e. the second radiator 600 is operated, in the cooling and heating system according to the present invention.

In FIG. 3, the blue line indicates a path along which liquefied hydrogen passes through the first heat exchanger 100 and is fed to the second heat exchanger 200, which performs heat exchange with the liquefied hydrogen to form gaseous hydrogen, the red line indicates a path along which the gaseous hydrogen formed as the result of heat exchange is supplied to the fuel cell 300, and the green line indicates a circulation path of a coolant for cooling the fuel cell 300 and a path along which the coolant is fed to the third heat exchanger 400, which performs heat exchange with the coolant, and the coolant is fed again along a coolant circulation path after heat exchange. Here, the first radiator 500 is inactivated and thus not operated, and only the second radiator 600 is activated and thus operated.

When the second radiator 600 is operated under control of the controller 700, the solenoid valve 410 is opened at the same time, and a coolant discharged after cooling the fuel cell 300 is fed along the second path P2. The coolant fed along the second path P2 is supplied to the third heat exchanger 400 in the second radiator 600, which performs heat exchange with the coolant. Hot air generated in the third heat exchanger 400 at this time is supplied to the air conditioning room R through the blower 610 in the second radiator 600 in order to decrease temperature in the vehicle.

Subsequently, the heat-exchanged coolant is fed again along the first path P1, and is circulated in the refrigerant circuit for cooling the fuel cell 300. That is, the coolant is supplied to the second heat exchanger 200, by which the temperature of the coolant is further lowered, and is then supplied to the fuel cell 300.

Even in this case, the coolant for cooling the fuel cell 300 is circulated while passing through the first path P1 in order to cool the fuel cell 300, and fuel must be supplied to the vehicle through the second heat exchanger 200 irrespective of operation of the second radiator 600, and therefore the second heat exchanger 200 is constantly operated when the vehicle is powered on or started.

As described above, the present invention utilizes a power supply source apparatus of a conventional hydrogen fuel vehicle as a cooling and heating system, wherein the heat exchanger necessary in the process of heat-exchanging liquefied hydrogen (the first heat exchanger) is utilized as a heating means, and cool air generated in the process of cooling high-temperature coolant discharged after cooling the fuel cell through the heat exchanger (the third heat exchanger) is utilized as a cooling means.

Since the conventional apparatus is utilized, the cooling and heating system according to the present invention may be economical, the structure of the cooling and heating system may be simplified, the interior of the vehicle may be simply designed, and usability of the cooling and heating system may be high.

In addition, cold energy of liquefied hydrogen is circulated for the purpose of cooling, and hot energy of a coolant discharged from the fuel cell is circulated for the purpose of heating. That is, energy generated in the process of heat-exchanging the liquefied hydrogen and energy generated in the process of cooling the coolant are utilized. As a result, a separate energy source for cooling and heating or a complicated apparatus is not needed, whereby it is possible to efficiently utilize energy.

Although the present invention has been described in detail based on preferred embodiments, those skilled in the art will appreciate that the present invention is not limited thereto and that various modifications, additions, and substitutions are possible without departing from the scope and spirit of the invention as disclosed in the accompanying claims. Consequently, the true technical protection scope of the present invention should be interpreted by the following claims, and all technical concepts included in a range equivalent thereto should be interpreted as falling within the scope of right of the present invention.

What is claimed is:

1. A cooling and heating system of a hydrogen fuel vehicle using a fuel cell configured to generate electricity with hydrogen and oxygen supplied thereto as a power supply source, the cooling and heating system comprising:

a first heat exchanger configured to perform heat exchange with liquefied hydrogen supplied from a liquefied hydrogen tank;

a second heat exchanger configured to perform heat exchange with the fluid heat-exchanged with the first heat exchanger in order to form gaseous hydrogen and to perform heat exchange with a coolant discharged after cooling the fuel cell and then supplied along a first path;

the fuel cell configured to generate electricity with the gaseous hydrogen, formed as a result of heat exchange performed by the second heat exchanger, and oxygen supplied thereto;

a third heat exchanger configured to perform heat exchange with a coolant discharged after cooling the fuel cell and then supplied along a second path;

a first radiator having the first heat exchanger disposed therein, the first radiator being configured to supply cool air in the fluid passing through the first heat exchanger into the vehicle;

and a second radiator having the third heat exchanger disposed therein, the second radiator being configured to supply hot air in the fluid passing through the third heat exchanger into the vehicle, wherein the second heat exchanger is constantly operated, and the first radiator and the second radiator are selectively operated under control of a controller, wherein, in a case in which the first radiator is not operated, the first heat exchanger is provided as a path along which the liquefied hydrogen passes, whereby the liquefied hydrogen is supplied to the second heat exchanger.

2. The cooling and heating system according to claim 1, wherein the first radiator and the second radiator are configured such that blowers are installed adjacent to the first heat exchanger and the second heat exchanger in order to supply the cool air and the hot air into the vehicle, respectively.

3. The cooling and heating system according to claim 1, wherein the first radiator and the second radiator are configured such that filters are formed in paths along which the cool air and the hot air pass, respectively.

4. The cooling and heating system according to claim 1, wherein the coolant heat-exchanged with the second heat exchanger is supplied to the fuel cell through a pump in order to cool the fuel cell.

5. The cooling and heating system according to claim 1, wherein a check valve is formed in the first path in order to supply the coolant discharged from the fuel cell toward the second heat exchanger.

6. The cooling and heating system according to claim 1, wherein a solenoid valve is formed in the second path, the solenoid valve is closed to supply the coolant to the second heat exchanger along the first path under control of the controller when a summer season mode is executed, and the solenoid valve is opened to supply the coolant to the second heat exchanger and the third heat exchanger along the second path under control of the controller when a winter season mode is executed.

7. The cooling and heating system according to claim 1, wherein the cool air in the fluid that has passed through the first heat exchanger or the hot air in the fluid that has passed through the third heat exchanger is supplied to an air conditioning room in the vehicle.

\* \* \* \* \*